United States Patent
Cai et al.

(10) Patent No.: US 11,736,017 B2
(45) Date of Patent: Aug. 22, 2023

(54) PULSE FREQUENCY MODULATION CONTROL METHODS FOR MULTI-PHASE POWER CONVERTERS WITH COUPLED INDUCTORS

(71) Applicant: Apple Inc., Cupertino, CA (US)

(72) Inventors: Chongli Cai, San Jose, CA (US); Hao Zhou, San Jose, CA (US); Jay B. Fletcher, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 17/482,215

(22) Filed: Sep. 22, 2021

(65) Prior Publication Data

US 2022/0103074 A1 Mar. 31, 2022

Related U.S. Application Data

(60) Provisional application No. 63/083,404, filed on Sep. 25, 2020.

(51) Int. Cl.
*H02M 3/158* (2006.01)
*H02M 3/157* (2006.01)
*H02M 1/00* (2006.01)

(52) U.S. Cl.
CPC ........ *H02M 3/1586* (2021.05); *H02M 1/0009* (2021.05); *H02M 3/157* (2013.01)

(58) Field of Classification Search
CPC ........ H02M 1/32; H02M 1/36; H02M 1/0043; H02M 1/0058; H02M 1/0048; H02M 1/0009; H02M 3/156; H02M 3/158; H02M 3/1586; H02M 3/157
See application file for complete search history.

(56) References Cited

U.S. PATENT DOCUMENTS

| | | | |
|---|---|---|---|
| 8,878,501 B2 * | 11/2014 | Kalje | H02M 3/1584 323/272 |
| 10,122,269 B2 | 11/2018 | Gozzini et al. | |
| 10,404,162 B2 | 9/2019 | Giuliano | |
| 2011/0169327 A1 * | 7/2011 | Bonnet | H02J 1/102 307/82 |
| 2012/0286750 A1 * | 11/2012 | Xu | H02M 3/156 323/282 |
| 2017/0090501 A1 * | 3/2017 | Fletcher | G05F 3/08 |
| 2018/0083532 A1 * | 3/2018 | Gozzini | H02M 3/156 |
| 2018/0083534 A1 * | 3/2018 | Pant | H02M 3/158 |
| 2023/0092655 A1 * | 3/2023 | Cai | H02M 1/084 |

* cited by examiner

*Primary Examiner* — Thienvu V Tran
*Assistant Examiner* — Shahzeb K Ahmad
(74) *Attorney, Agent, or Firm* — Kowert, Hood, Munyon, Rankin & Goetzel, P.C.; Dean M. Munyon

(57) ABSTRACT

A power converter circuit that includes multiple phase circuits may employ coupled inductors to generate a particular voltage level on a regulated power supply node. Based on a comparison of a voltage level of the regulated power supply node and a reference voltage, the power converter circuit may initiate an active period, during which the phase circuits source respective currents to the regulated power supply node via corresponding coils included in the coupled inductor. After a time period has elapsed following an initiation of the active period, the operation of the phase circuits is adjusted so that the respective currents flowing in the coils of the coupled inductor are out of phase.

20 Claims, 13 Drawing Sheets

PULSE FREQUENCY MODULATION CONTROL METHODS FOR MULTI-PHASE POWER CONVERTERS WITH COUPLED INDUCTORS

PRIORITY INFORMATION

This application claims the benefit of U.S. Provisional Application No. 63/083,404, filed on Sep. 25, 2020, which is incorporated by reference herein in its entirety.

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit configured to generate a regulated power supply voltage level are disclosed. Broadly speaking, a first phase circuit is coupled to a first switch node that is coupled to a regulated power supply node via a first coil included in a pair of coupled inductors that includes the first coil, a second coil, and a common magnetic core. A second phase circuit is coupled to a second switch node that is coupled to the regulated power supply node via the second coil. A control circuit is configured to initiate, based on a voltage level of the regulated power supply node and a reference voltage level, an active period for the first phase circuit and the second phase circuit. In response to an initiation of the active period, the first phase circuit is configured to perform a first plurality of on-time periods, wherein any two on-time periods of the first plurality of on-time periods are separated by an off-time period, and the second phase circuit is configured to perform a second plurality of on-time periods, wherein any two on-time periods of the second plurality of on-time periods are separated by an off-time period. After a particular time period has elapsed since the initiation of the active period, a first current in the first coil is out of phase with a second current in the second coil. By having the first and second currents out of phase, loss in the common magnetic core may be reduced, improving the efficiency of the power converter, and the first and second phase circuits may be able to deliver similar average currents to a load.

BRIEF DESCRIPTION OF THE DRAWINGS

The following detailed description makes reference to the accompanying drawings, which are now briefly described.

DETAILED DESCRIPTION OF EMBODIMENTS

Figure 1:
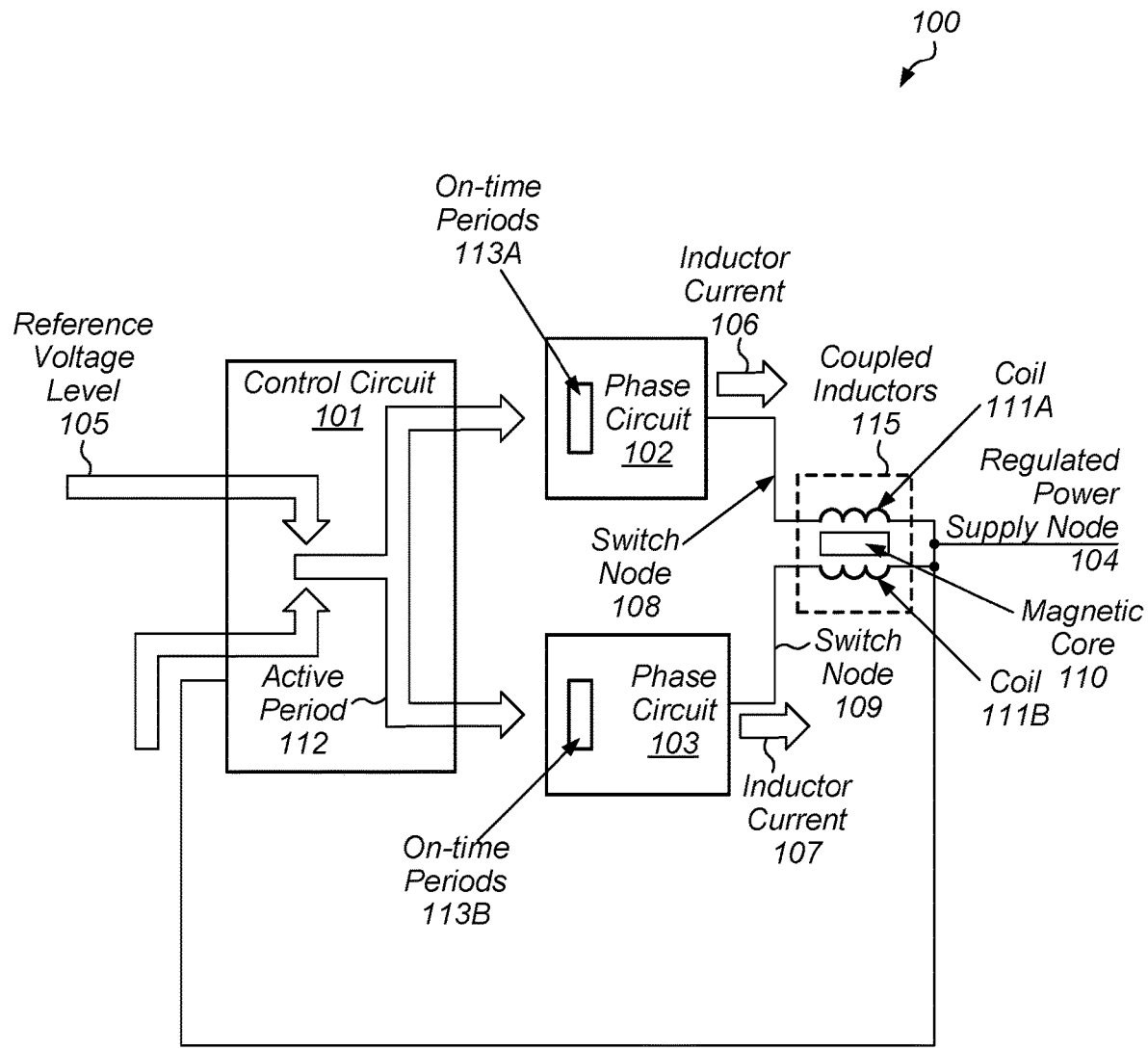
FIG. 1 is a block diagram of an embodiment of a power converter circuit.

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include two switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is, energy is applied to the inductor, allow the current through the inductor to increase. Such a time period may be referred to as an "on-time period" or a "charge period." During one of these time periods, the inductor stores energy in the form of a magnetic field. When the high-side switch is opened and the low-side switch is closed, energy is no longer being applied to the inductor, and the voltage across the inductor reverses. During these periods, which may be referred to as "off-time periods", the inductor functions as a current source, with the energy stored in the inductor's magnetic field supporting the current flowing into the load. The process of closing and opening the high-side and low-side switches is performed periodically to maintain a desired voltage level on the power supply node.

The power switches included in buck converters may be operated in different modes. In some cases, a buck converter may employ pulse width modulation (PWM), in which the frequency with which the buck converter cycles is fixed, but the period of time that the high-side switch is closed is adjusted based on a comparison of an output voltage of the buck converter to a reference voltage. In other cases, a buck converter may employ pulse frequency modulation (PFM), in which the frequency with which the buck converter cycles (including on-time, off-time, and idle time) is adjusted based on the load current.

Some buck converters may employ multiple inductors driven by respective phase circuits (also referred to as "phase units"). The phase circuits are operated out of phase with each other to better manage power delivered to a load. In order to reduce the area needed for multiple inductors, coupled inductors may be used. As used and described herein, "coupled inductors" refer to two or more inductors that share a common magnetic core. The use of a common magnetic core allows some degree of mutual inductance between the pair of inductors.

In multi-phase power converters that employ coupled inductors, there may be a loss of energy in the common magnetic core resulting from current ripple in the coils, as well as a loss of efficiency in situations in which a load circuit does not require a large amount of current. Moreover, the average current delivered by the different phase currents may not equal, further degrading the efficiency of the multi-phase power converter. The inventors realized that by controlling the phase relationship between the currents flowing in the coupled inductors, the average current by the different phase circuits may be made equal, and losses in the common magnetic core may be reduced by minimizing current ripple, thereby improving the efficiency of the power converter.

The embodiments illustrated in the drawings and described below provide techniques for operating a power converter circuit to maintain a particular phase relationship between respective currents flowing in coupled inductors in a multi-phase power converter. These embodiments may serve to reduce energy loss, improve efficiency, and allow the phase circuits to deliver similar average currents to a load.

A block diagram depicting an embodiment of a power converter circuit is illustrated in FIG. 1. As illustrated, power converter circuit 100 includes control circuit 101, phase circuit 102, phase circuit 103, and coupled inductors 115.

Control circuit 101 is configured to initiate, based on a voltage level of the regulated power supply node 104 and reference voltage level 105, active period 112 for the phase circuits 102 and 103. In various embodiments, control circuit 101 is configured to operate phase circuits 102 and 103 in PFM mode.

Phase circuit 102 is coupled to switch node 108, which is coupled to regulated power supply node 104 via coil 111A included in coupled inductors 115. In various embodiments, coupled inductors 115 includes coil 111A, coil 111B, and magnetic core 110 that is common to both coil 111A and 111B. Phase circuit 103 is coupled to switch node 109, which is coupled to regulated power supply node 104 via coil 111B. Although two phase circuits are depicted in embodiment of FIG. 1, in other embodiments, any suitable number of phase circuits may be employed to increase the amount of current power converter circuit 100 can provide to a load.

Once active period 112 has been initiated, phase circuits 102 and 103 begin to cycle between on-time periods where the high-side switch is closed and off-time periods wherein the low-side switch is closed. As described below, duration of the on-time and off-time periods may be varied according to different regulation schemes, such as an on-time valley current control scheme or an off-time peak current control scheme. In various embodiments, control circuit 101 may halt active period 112 in response to a determination that phase circuits 102 and 103 have cycled through a particular number of on-time periods and off-time periods. Since power converter 100 is operating in PFM mode, a duration between initiations of active period 112 is determined by the load current.

Phase circuit 102 is configured, in response to an initiation of active period 112, to cycle between on-time periods 113A and corresponding off-time periods after a starting on-time period has elapsed. As described above, during a given one of on-time periods 113A, phase circuit 102 may supply energy, in the form of a current, to switch node 108, which increases the current flowing through coil 111A, storing energy in its magnetic field. In various embodiments, any two on-time periods of on-time periods 113A are separated by an off-time period, during which phase circuit 102 halts the supply of energy to switch node 108. During such an off-time period, energy may still be applied to regulated power supply node 104 as a magnetic field of coil 111A collapses. As described below, the duration of the starting on-time period may be different than subsequent on-times periods.

Phase circuit 103 is configured, in response to the initiation of active period 112, to cycle between on-time periods 113B and corresponding off-time periods after the starting on-time period has elapsed. During a given one of on-time periods 113B, phase circuit 103 may supply energy, in the form of a current, to switch node 109, which increases the current flowing through coil 111B storing energy in its magnetic field. As with phase circuit 102, any two on-time periods of on-time periods 113B are separated by an off-time period, during which phase circuit 103 halts the supply of energy to switch node 108. During such an off-time period, energy may still be applied to regulated power supply node 104 as a magnetic field of coil 111B collapses. By having both phase circuits 102 and 103 active during the starting on-time period, the currents in coils 111A and 111B are allowed to reach a particular value before a phase shift is induced between the two currents.

After the starting on-time period has elapsed, a duration of initial on-time of phase circuit 103 is less than a duration of a subsequent on-time period of phase circuit 103. By employing a shorter initial on-time period after the starting on-time period, the on-time periods for phase circuit 103 have a phase difference than the on-time periods for phase circuit 102. As such, currents through coils 111A and 111B move out of phase with each other. In some cases, the currents may be 180 degrees out of phase. With the currents flowing in coils 111A and 111B out of phase, the efficiency of power converter circuit 100 may be improved by reducing loss in magnetic core 110. Moreover, phase circuits 102 and 103 may be able to deliver similar average currents to a load coupled to regulated power supply node 104, improving the efficiencies of phase circuits 102 and 103.

Phase circuits, such as phase circuits 102 and 103 may operate in a variety of fashions. For example, for a fixed set of values of the voltage level of regulated output node 104 and a voltage level of an input power supply, the duration of an on-time period is fixed, while the duration of the an off-time period is based on a comparison of a current flowing in an inductor to a threshold value. This type of operation is commonly referred to as "valley control." Alternatively, for a fixed set of values of the voltage level of regulated output node 104 and a voltage level of an input power supply, the duration of the off-time may be fixed, while the duration of the on-time period is based on a comparison of the inductor current to a threshold value.

Figure 2:
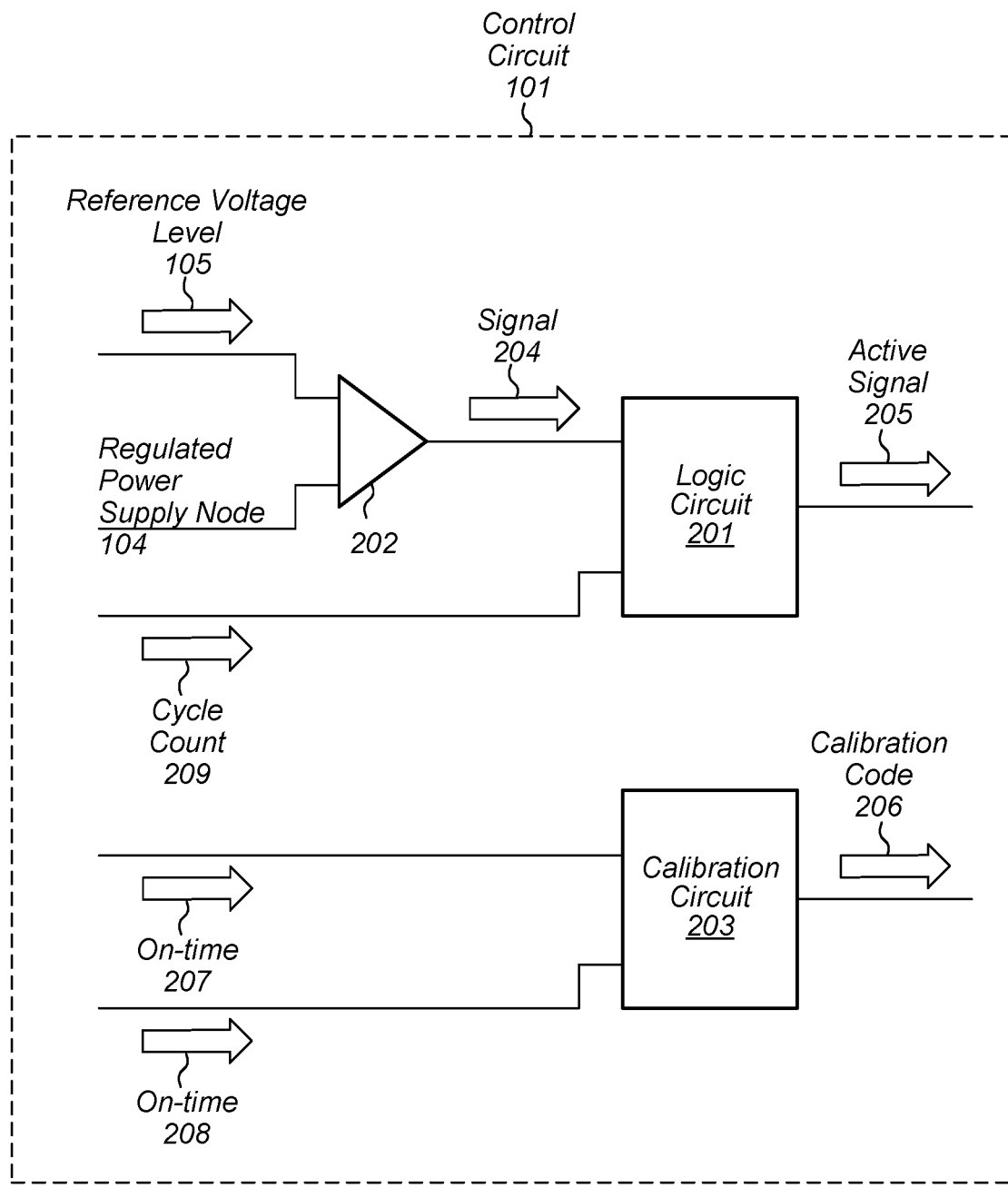
FIG. 2 is a block diagram of an embodiment of a control circuit for a power converter circuit.

A block diagram of an embodiment of control circuit 101 is depicted in FIG. 2. As illustrated, control circuit 101 includes logic circuit 201, comparator 202, and calibration circuit 203.

Comparator 202 is configured to generate signal 204 based on a comparison of reference voltage level 105 and a voltage level of regulated power supply node 104. For example, comparator 202 may assert signal 204 in response to a determination that the voltage level of regulated power supply node 104 is less than reference voltage level 105. Comparator 202 may, in various embodiments, be an embodiment of a differential amplifier or other circuit suitable for comparing two voltage levels.

Logic circuit 201 may be an embodiment of a microcontroller or state machine configured to generate active signal 205 using signal 204 and cycle count 209. In some embodiments, logic circuit 201 may assert active signal 205 in response to an assertion of signal 204. Logic circuit 201 may also be configured to de-assert active signal 205 in response to cycle count 209 reaching a threshold value. In various embodiments, cycle count 209 may correspond to a number of on-time (or off-time) periods that phase circuits 102 and 103 complete upon being activated, and the threshold value may be programmable. It is noted that, if signal 204 is still asserted when cycle count 209 reaches the threshold value, or there is a transition to PWM mode, logic circuit 201 may be configured to re-activate active signal 205 without any inactive period.

In cases where an adaptive off-time peak current control mode is employed, an additional calibration operation may be used to produce a desired 180-degree phase shift between the currents flowing in coils 111A-B. Calibration circuit 203 is configured to generate calibration code 206 using on-time 207 and on-time 208. It is noted that initial on-time 207 may correspond to a duration of a first full on-time of phase circuit 102 after an initial on-time, while on-time 208 may correspond to a duration of a first full on-time of phase circuit 103 after an initial on-time. As described below in more detail, calibration circuit 203 is configured to sample on-time 207 and on-time 208, and compare the results to generate calibration code 206, which may be used to adjust the initial on-time such that the initial peak current level can be adjusted. It is noted that by employing off-time signals instead of on-time signals, calibration circuit 203 may be used in situations where an adaptive on-time valley current control mode is being employed.

Figure 3:
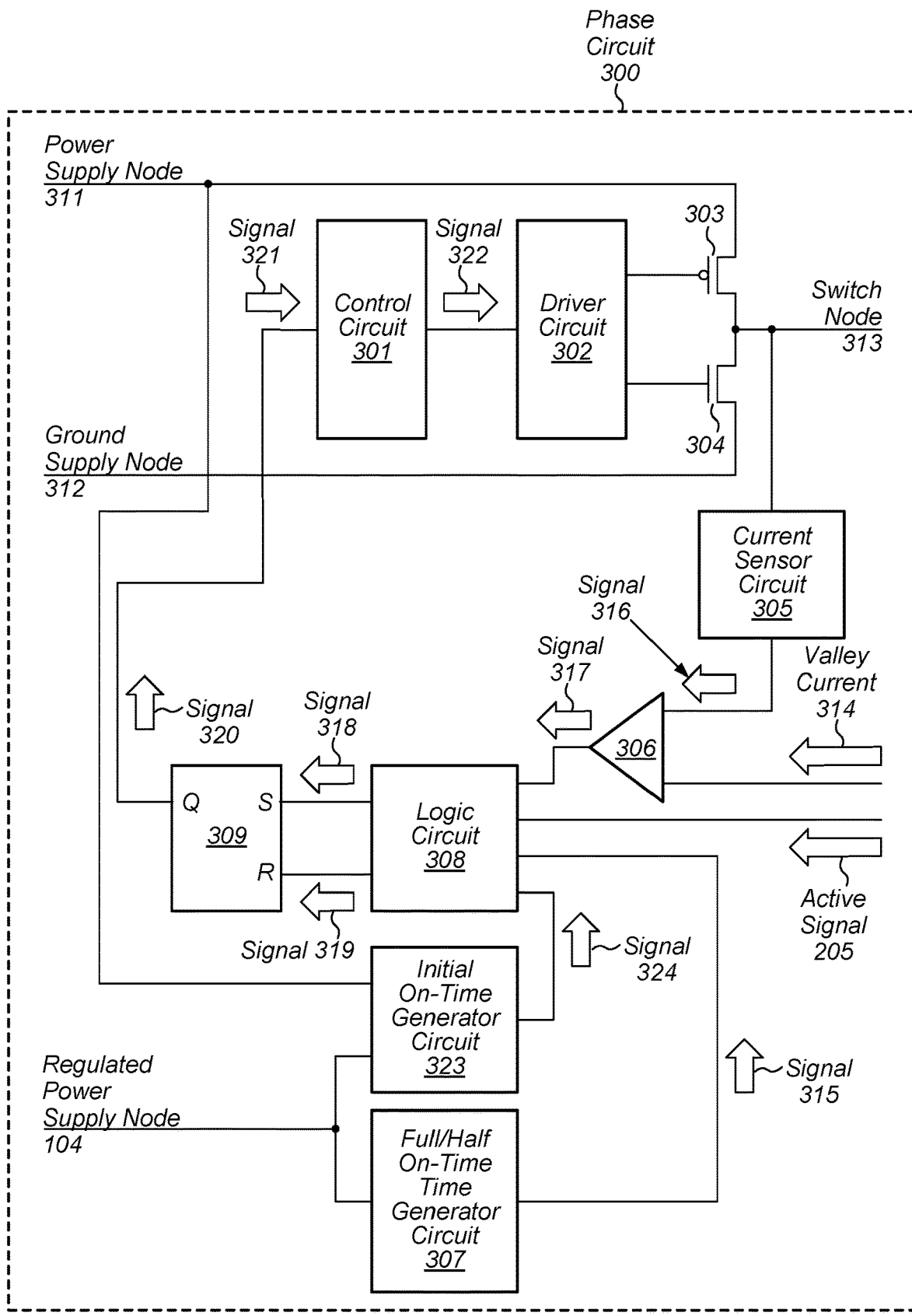
FIG. 3 is a block diagram of an embodiment of a phase circuit that employs an adaptive on-time regulation scheme.

Turning to FIG. 3, an embodiment of a phase circuit that employs valley control is depicted. As illustrated, phase circuit 300 includes control circuit 301, driver circuit 302, devices 303 and 304, current sensor circuit 305, comparator 306, on-time generator circuit 307, logic circuit 308, and latch circuit 309. It is noted, that phase circuit 300 may correspond to either of phase circuits 102 and 103 as depicted in FIG. 1.

Control circuit 301 is configured to generate signal 322 using signal 321. In various embodiments, control circuit 301 may be a microcontroller, state machine, or other sequential logic circuit configured to control disable driver circuit 302 during the time period (referred to as a "dead time") between different active periods. During active periods, control circuit 301 is configured to generate signal 322 so as to activate and de-activate devices 303 and 304 based on whether phase circuit 300 is operating in an on-time period or an off-time period as indicated by signal 321.

Driver circuit 302 is configured to selectively activate device 303 and device 304 based on signal 321. In various embodiments, driver circuit 302 may activate device 303 and de-activate device 304 during an on-time period, and de-activate device 303 and activate device 304 during an off-time period. Driver circuit 302 may, in various embodiments, include multiple inverter circuits and other logic gates.

Device 303 is coupled between power supply node 311 and switch node 313, and is configured to selectively couple switch node 313 to power supply node 311 during an on-time period, allowing a current to flow from power supply node 311 to switch node 313. Device 304 is coupled between switch node 313 and ground supply node 312, and is configured to selectively couple switch node 313 during an off-time period allowing a current to recirculate from ground supply node 312 to switch node 313. In various embodiments, device 303 may be an embodiment of a p-channel metal-oxide semiconductor field-effect transistor (MOSFET), while device 304 may be an embodiment of an n-channel MOSFET.

Current sensor circuit 305 is configured to sense a current flowing in switch node 313 to generate signal 316. In various embodiments, signal 316 may be a current proportional to the current flowing in switch node 313. In some cases, current sensor circuit 305 may include a sense resistor, or other suitable device in series with switch node 313 in order to determine an amount of current flowing in switch node 313.

Comparator 306 is configured to generate signal 317 based on a comparison of signal 316 and valley current 314. For example, comparator 306 may assert signal 317 in response to a determination that a value of signal 316 is less than valley current 314 In various embodiments, comparator 306 may be an embodiment of a differential amplifier or other suitable circuit capable of comparing two currents.

Initial on-time generator circuit 323 is configured to generate signal 324 using the voltage level of regulated power supply node 104 and the voltage level of power supply node 311. As described below, initial on-time generator circuit 323 may employ different circuits in order to activate signal 324 after a particular amount of time has elapsed. During the initial on-time tracked by initial on-time generator circuit 324, the high side switches of both phase circuit 102 and phase circuit 103 are closed, allowing the currents in both coils 111A and 111B to reach an initial peak value. At the end of an initial on-time, initial on-time generator circuit 323 is reset in order to be ready to determine an initial on-time period for a subsequent PFM cycle.

After the an initial on-time, as tracked by initial on-time generator circuit 323, the timing of phase circuits 102 and 103, for the rest of a PFM cycle, is determined using signal 315 generated by full/half on-time generator circuit 307. In various embodiments, full/half on-time generator circuit 307 is configured to generate signal 315 using the voltage level of regulated power supply node 104 and the voltage level of power supply node 311. As described below, on-time generator circuit 307 may employ different circuits in order to activate signal 315 after a particular amount of time has elapsed. In various embodiments, full/half on-time generator circuit 307 may be reset in response to a de-assertion of signal 320.

Logic circuit 308 may be an embodiment of a microcontroller, state machine, or other sequential logic circuit configured to generate signals 318 and 319 using signal 317, active signal 205, and signal 315. In various embodiments, logic circuit 308 may be configured to assert signal 318, thereby setting latch circuit 308, in response to an assertion of active signal 205. In some cases, the assertion of active signal 205 may correspond to an initiation of active period 112. Logic circuit 308 may be further configured, in response to an assertion of signal 315, to assert signal 319 thereby re-setting latch circuit 309, starting an off-time period.

When the inductor current reaches the threshold defined by valley current 314, signal 317 is asserted. In response to the assertion of signal 317, logic circuit 308 is configured to de-assert signal 319 and assert signal 318, ending the off-time period and starting a new on-time period. Logic circuit 308 may continue to alternate between on-time and off-time periods until active signal 205 is de-asserted. It is noted that at the same load current, setting a higher value for valley current 314 can reduce the frequency of active periods than a lower value for valley current 314. Higher values for valley current 314 allow for the support of higher load currents, while lower values for valley current 314 may result in less conduction loss.

Latch circuit 309 may be an embodiment of a set-reset latch (also referred to as a "SR latch") that is configured to assert signal 320 in response to an assertion of signal 318. Latch circuit 309 is also configured to de-assert signal 320 in response to an assertion of signal 319 regardless of the logic value of signal 318.

Figure 4:
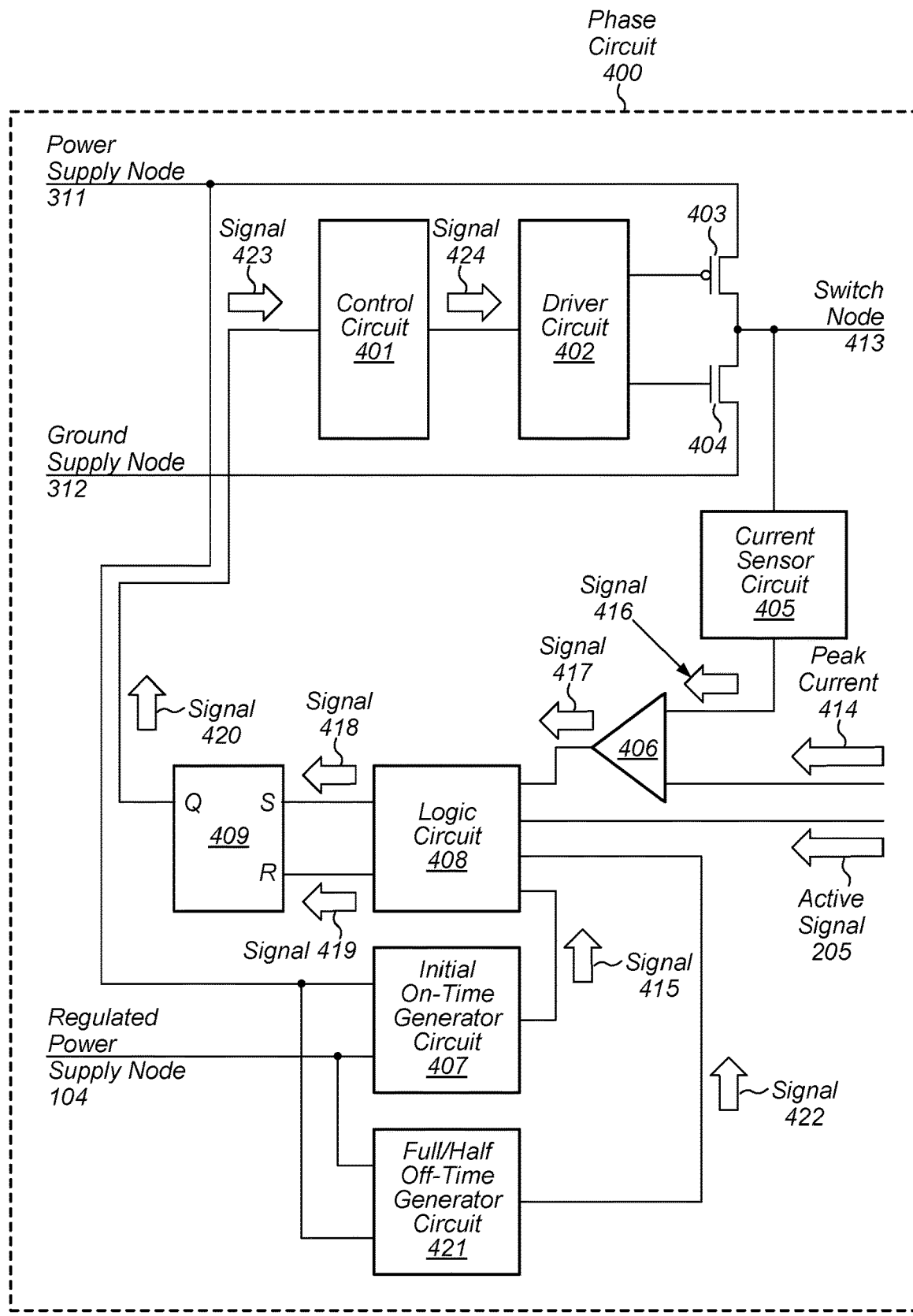
FIG. 4 is a block diagram of an embodiment of a phase circuit that employs an adaptive off-time regulation scheme.

Turning to FIG. 4, an embodiment of a phase circuit that employs off-time peak current control is depicted. As illustrated, phase circuit 400 includes control circuit 401, driver circuit 402, devices 403 and 404, current sensor circuit 405, comparator 406, initial on-time generator circuit 407, logic circuit 408, latch circuit 409, and full/half off-time generator circuit 421. It is noted, that phase circuit 400 may correspond to either of phase circuits 102 and 103 as depicted in FIG. 1.

Control circuit 401 is configured to generate signal 424 using signal 423. In various embodiments, control circuit 401 may be a microcontroller, state machine, or other sequential logic circuit configured to control disable driver circuit 402 during the time period (referred to as a "dead time") between different active periods. During active periods, control circuit 401 is configured to generate signal 424 so as to activate and de-activate devices 403 and 404 based on whether phase circuit 400 is operating in an on-time period or an off-time period as indicated by signal 423.

Driver circuit 402 is configured to selectively activate device 403 and device 404 based on signal 424. In various embodiments, driver circuit 402 may activate device 403 and de-activate device 404 during an on-time period, and de-activate device 403 and activate device 404 during an off-time period. Driver circuit 402 may, in various embodiments, include multiple inverter circuits and other logic gates.

Device 403 is coupled between power supply node 311 and switch node 413, and is configured to selectively couple switch node 413 to power supply node 311 during an on-time period, allowing a current to flow from power supply node 311 to switch node 413. Device 404 is coupled between switch node 413 and ground supply node 312, and is configured to selectively couple switch node 413 during an off-time period allowing a current to recirculate from ground supply node 312 to switch node 413. In the depicted embodiment, device 403 is implemented as a p-channel MOSFET, while device 404 is implemented as an n-channel MOSFET.

Current sensor circuit 405 is configured to sense a current flowing in switch node 413 to generate signal 416. In various embodiments, signal 416 may be a current proportional to the current flowing in switch node 413. In some cases, current sensor circuit 405 may include a sense resistor, (or other suitable device in series with switch node 413) in order to determine an amount of current flowing in switch node 413.

Comparator 406 is configured to generate signal 417 based on a comparison of signal 416 and peak current 414. For example, comparator circuit 406 may assert signal 417 in response to a determination that a value of signal 416 is greater than peak current 414 In various embodiments, comparator 406 may be implemented as a differential amplifier or other suitable circuit capable of comparing two currents.

Initial on-time generator circuit 407 is configured to generate signal 415 using the voltage level of regulated power supply node 104 and the voltage level of power supply node 311. As described below, initial on-time generator circuit 407 may employ different circuits in order to activate signal 415 after a particular amount of time has elapsed. During the initial on-time tracked by initial on-time generator circuit 407, the high side switches of both phase circuit 102 and phase circuit 103 are closed, allowing the currents in both coils 111A and 111B to reach an initial peak value. At the end of a PFM cycle, initial on-time generator circuit 407 is reset in order to be ready to determine an initial on-time period for a subsequent PFM cycle.

After the initial on-time tracked by initial on-time generator circuit 407, timing of phase circuits 102 and 103, for the rest of the PFM cycle, is determined using signal 422 generated by full/half off-time generator circuit 421. In various embodiments, full/half off-time generator circuit 421 is configured to generate signal 422 using the voltage level of regulated power supply node 104 and the voltage level of power supply node 311. As described below, full/half off-time generator circuit 421 may employ different circuits in order to activate signal 422 after a particular amount of time has elapsed. In some cases, signal 422 may be activated to provide a full off-time, and in other cases, signal 422 may be activated to provide a half off-time, which may be used to induce the desired phase shift in the coil currents. In various embodiments, full/half off-time generator circuit 421 may be reset in response to a de-assertion of signal 420.

Logic circuit 408 may be an embodiment of a microcontroller, state machine, or other sequential logic circuit configured to generate signals 418 and 419 using signal 417, active signal 205, signal 415, and signal 422. In various embodiments, logic circuit 408 may be configured to assert signal 418, thereby setting latch circuit 308, in response to an assertion of active signal 205. In some cases, the assertion of active signal 205 may correspond to an initiation of active period 112.

Logic circuit 408 may be further configured, in response to an assertion of signal 415, to assert signal 419 thereby re-setting latch circuit 409, starting an off-time period after an initial on-time period. For subsequent on-time periods, when the inductor current is greater than peak current 414, signal 417 is asserted. In response to the assertion of signal 417, logic circuit 408 is configured to de-assert signal 418 and assert signal 419, ending the on-time period and starting an off-time period.

Once an off-time period has been started, full/half off-time generator circuit 421 may activate signal 422 when a given time has elapsed. In response to an assertion of signal 422, logic circuit 408 is configured to de-assert signal 419 and assert signal 418, ending the off-time period and starting another on-time period. Logic circuit 408 may continue to alternate between on-time and off-time periods until active signal 205 is de-asserted. In some cases, full/halt off-time generator circuit 412 may activate signal 422 when a different time has elapsed that is less than the given time. For example, the different time may be half of the given time.

Latch circuit 409 may be an embodiment of a set-reset latch (also referred to as a "SR latch") that is configured to assert signal 420 in response to an assertion of signal 418. Latch circuit 409 is also configured to de-assert signal 420 in response to an assertion of signal 419 regardless of the logic value of signal 418.

Figure 5:
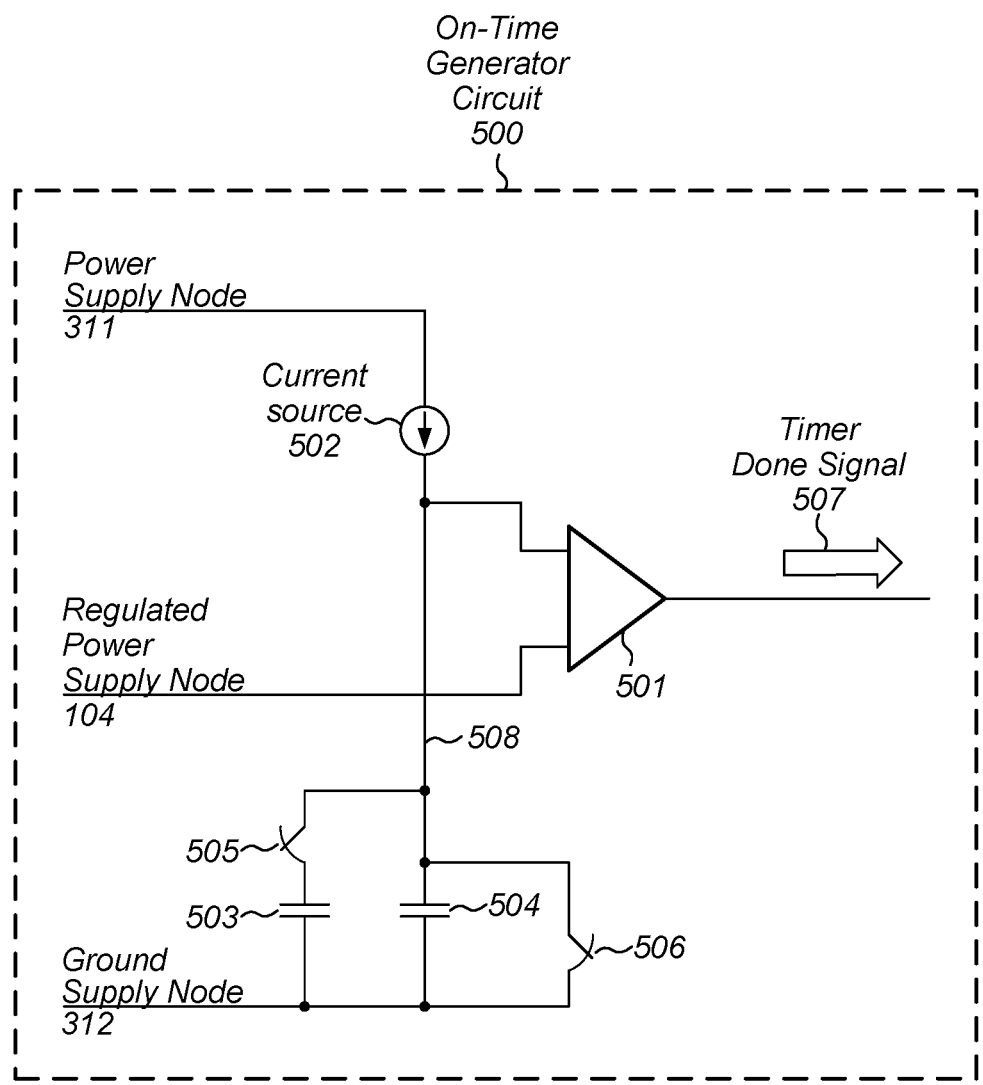
FIG. 5 is a block diagram of an embodiment of an on-time generator circuit.

Various circuit topologies may be used to determine the on and off times for the phase circuits. An embodiment of an full/half on-time generator circuit that is configured to determine a full on-time as well as a half on-time is depicted in FIG. 5. As illustrated, full/half on-time generator circuit 500 includes comparator circuit 501, current source 502, capacitors 503 and 504, and switches 505 and 506. It is noted that, in various embodiments, full/half on-time generator circuit 500 may correspond to full/half on-time generator circuit 307 as depicted in FIG. 3.

Current source 502 is coupled between power supply node 311 and node 508, and is configured to source current to node 508, charging capacitor 504 (and capacitor 503 when switch 505 is closed). In various embodiments, a value of current source 502 may be proportional to the voltage level of power supply node 311. The constant of proportionality may be a value of a resistor that is chosen, along with the values of capacitors 503 and 504, to set the full and half on-time values. In some embodiments, current source 502 may include one or more p-channel MOSFETs or other suitable transconductance devices configured to provide a particular conductance between power supply node 311 and node 508.

Capacitor 504 is coupled between node 508 and ground supply node 312, while capacitor 503 is coupled between switch 505 and ground supply node 312. Switch 505 is also coupled to node 508, while switch 506 is coupled between node 508 and ground supply node 312.

Switch 505 controls whether full/half on-time generator circuit 500 determines a full on-time or a half on-time. When switch 505 is closed, capacitors 503 and 504 are coupled in parallel, increasing the capacitance on node 508, thereby resulting in a longer time for the voltage level of node 508 to increase to the level of regulated power supply node 104. When switch 505 is open, capacitor 503 is not coupled to node 508, thereby allowing the voltage level of node 508 to increase more rapidly in response to the current from current source 502. Switch 506 is configured to selectively couple node 508 to ground supply node 312. Once timer done signal 507 has been asserted, switch 506 is closed, discharging node 508 to a voltage level at or near ground potential, readying full/half on-time generator circuit 500 for a next cycle.

Capacitors 503 and 504 may be constructed using a metal-oxide-metal, metal-insulator-metal, or other suitable structure available on a semiconductor manufacturing process. In some embodiments, capacitors 503 and 504 may be constructed so as to have similar capacitance values. Switches 505 and 506 may, in various embodiments, be implemented as either p-channel or n-channel MOSFETs, or any suitable combination thereof.

Comparator circuit 501 may be an embodiment of a differential amplifier configured to generate timer done signal 507 using the voltage level of regulated power supply node 104 and the voltage level of node 508. In various embodiments, timer done signal 507 may transition from a low logic level to a high logic level, in response to a determination that a voltage level of node 508 is greater than the voltage level of regulated power supply node 104.

Figure 6:
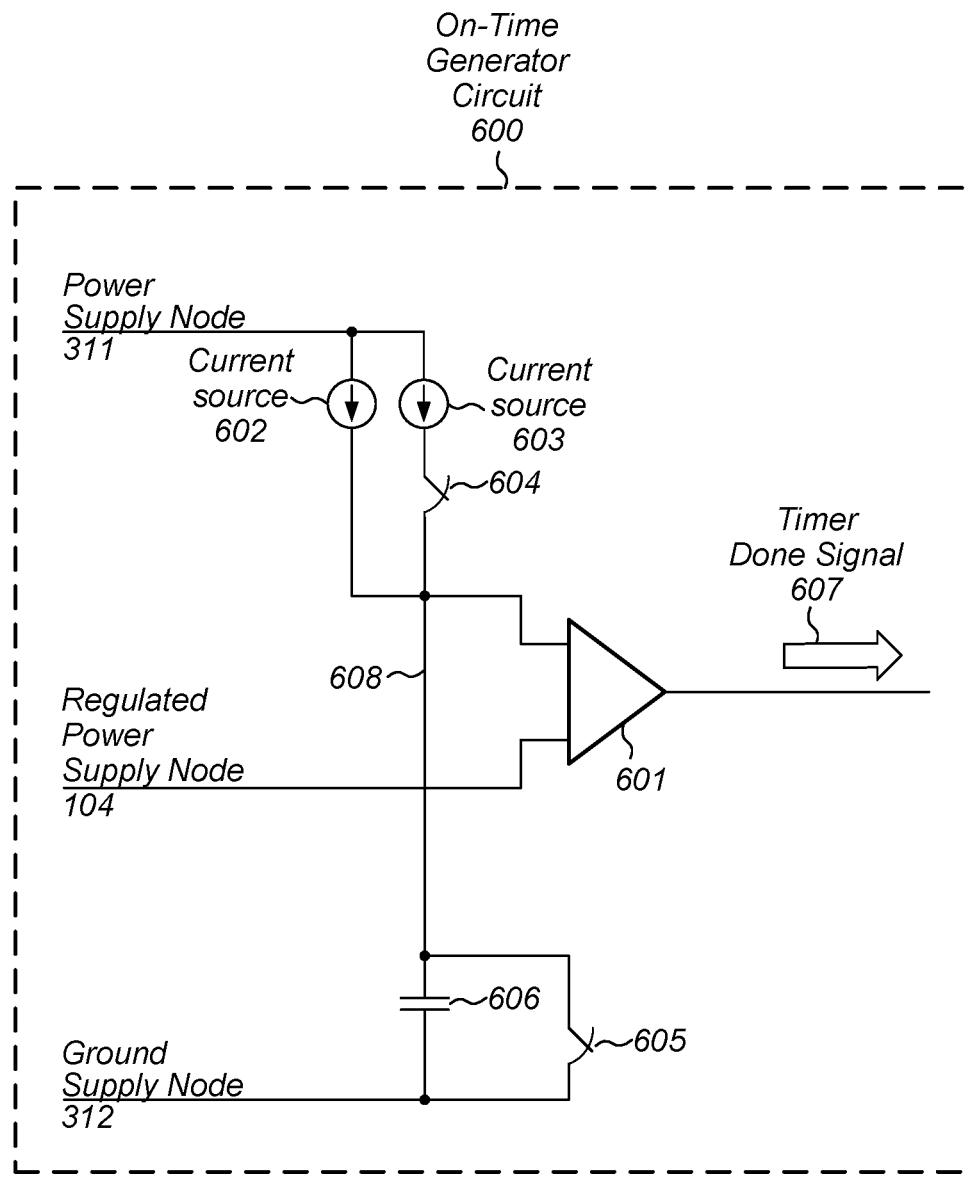
FIG. 6 is a block diagram of another embodiment of an on-time generator circuit.

Turning to FIG. 6, another embodiment of a full/half on-time generator circuit is depicted. As illustrated, full/half on-time generator circuit 600 includes comparator 601, current sources 602 and 602, capacitor 606, and switches 604 and 605. It is noted that full/half on-time generator circuit 600 may correspond to full/half on-time generator circuit 307 as depicted in FIG. 3.

Current source 602 is coupled between power supply node 311 and node 608, and is configured to source current to node 608, charging capacitor 606. In various embodiments, a value of current source 602 may be proportional to the voltage level of power supply node 311. The constant of proportionality may be a value of a resistor that is chosen, along with the values of capacitor 606, to set the full and half on-time values.

Current source 603 is coupled between power supply node 311 and switch 604, and is configured to source a current to node 608 when switch 604 is closed. In various embodiments, a value of the current sourced by current source 603 may be the same as a value of a current sourced by current source 602. When switch 604 is closed, current from both current source 602 and current source 603 charge capacitor 606, thereby reducing a time for the voltage across capacitor 606 to reach a target value. By charging capacitor 606 more rapidly, full/half on-time generator circuit 600 can generate a half on-time value, where timer done signal 607 is asserted in half the time compared to when switch 604 is open.

In some embodiments, current sources 602 and 603 may include one or more p-channel MOSFETs or other suitable transconductance devices configured to provide a particular conductance between power supply node 311 and node 508.

Capacitor 606 is coupled between node 608 and ground supply node 312, while switch 605 is also coupled between node 608 and ground supply node 312. Switch 605 is configured to selectively couple node 608 to ground supply node 312. Once timer done signal 607 has been asserted, switch 605 is closed, discharging node 608 to a voltage level at or near ground potential, readying full/half on-time generator circuit 600 for a next cycle.

Capacitor 606 may be constructed using a metal-oxide-metal or other suitable structures available on a semiconductor manufacturing process. Switches 604 and 605 may, in various embodiments, be particular embodiments of either p-channel or n-channel MOSFETs, or any suitable combination thereof.

Comparator 601 may be an embodiment of a differential amplifier configured to generate timer done signal 607 using the voltage level of regulated power supply node 104 and the voltage level of node 608. In various embodiments, timer done signal 607 may transition from a low logic level to a high logic level, in response to a determination that a voltage level of node 608 is greater than the voltage level of regulated power supply node 104.

Figure 7:
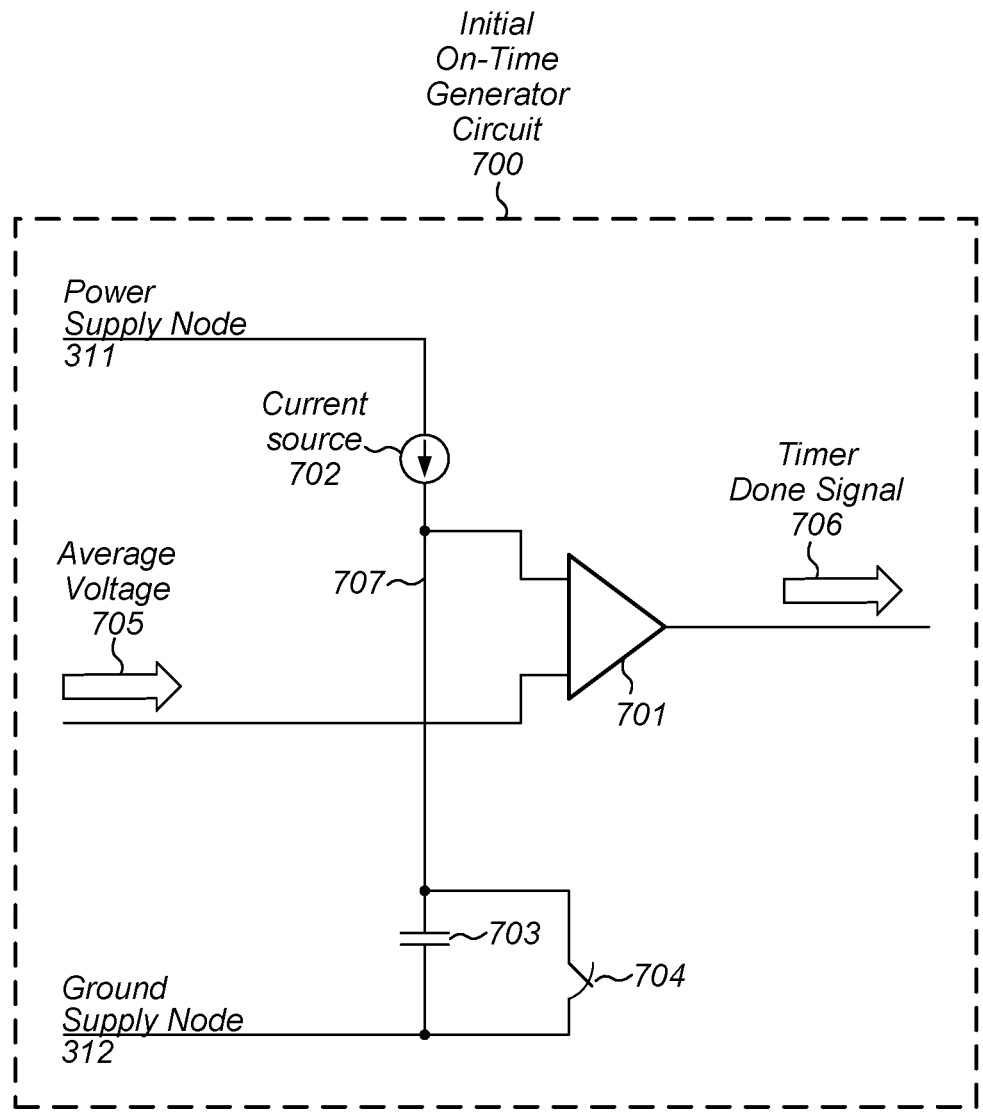
FIG. 7 is a block diagram of an embodiment of an initial on-time generator circuit.

A block diagram of an initial on-time generator circuit is depicted in FIG. 7. As illustrated, initial on-time generator circuit 700 includes comparator 701, current source 702, capacitor 703, and switch 704. In various embodiments, initial on-time generator circuit may correspond to initial on-time generation circuit 407 as depicted in FIGS. 3 and 4.

Current source 702 is coupled between power supply node 311 and node 707, and is configured to source current to node 707, charging capacitor 703. In various embodiments, a value of current source 702 may be proportional to a difference between the voltage level of power supply node 311 and the voltage level of regulated power supply node 104. The constant of proportionality may be a value of a resistor that is chosen, along with the values of capacitor 703, to set the initial on-time value. In some embodiments, current source 702 may include one or more p-channel MOSFETs or other suitable transconductance devices configured to provide a particular conductance between power supply node 311 and node 707.

Capacitor 703 is coupled between node 707 and ground supply node 312. Switch 704 is also coupled to node 707. Switch 704 is configured to selectively couple node 707 to ground supply node 312. Once timer done signal 706 has been asserted, switch 704 is closed, discharging node 707 to a voltage level at or near ground potential, readying initial on-time generator circuit 700 for a next cycle.

Capacitor 703 may be constructed using a metal-oxide-metal, metal-insulator-metal, or other suitable structures available on a semiconductor manufacturing process. Switch 704 may, in various embodiments, be implemented as either p-channel or n-channel MOSFETs, or any suitable combination thereof.

Comparator circuit 701 may be an embodiment of a differential amplifier configured to generate timer done signal 706 using average voltage 705 and the voltage level of node 707. Average voltage 705 may, in various embodiments, be proportional to an average current level of the currents flowing through both coils of the coupled inductors. It is noted that a value of average voltage 705 may determine a peak current in each coil of coupled inductors 115 after the initial on-time has elapsed. In various embodiments, timer done signal 706 may transition from a low logic level to a high logic level, in response to a determination that a voltage level of node 707 is greater than the average voltage 705.

Figure 8:
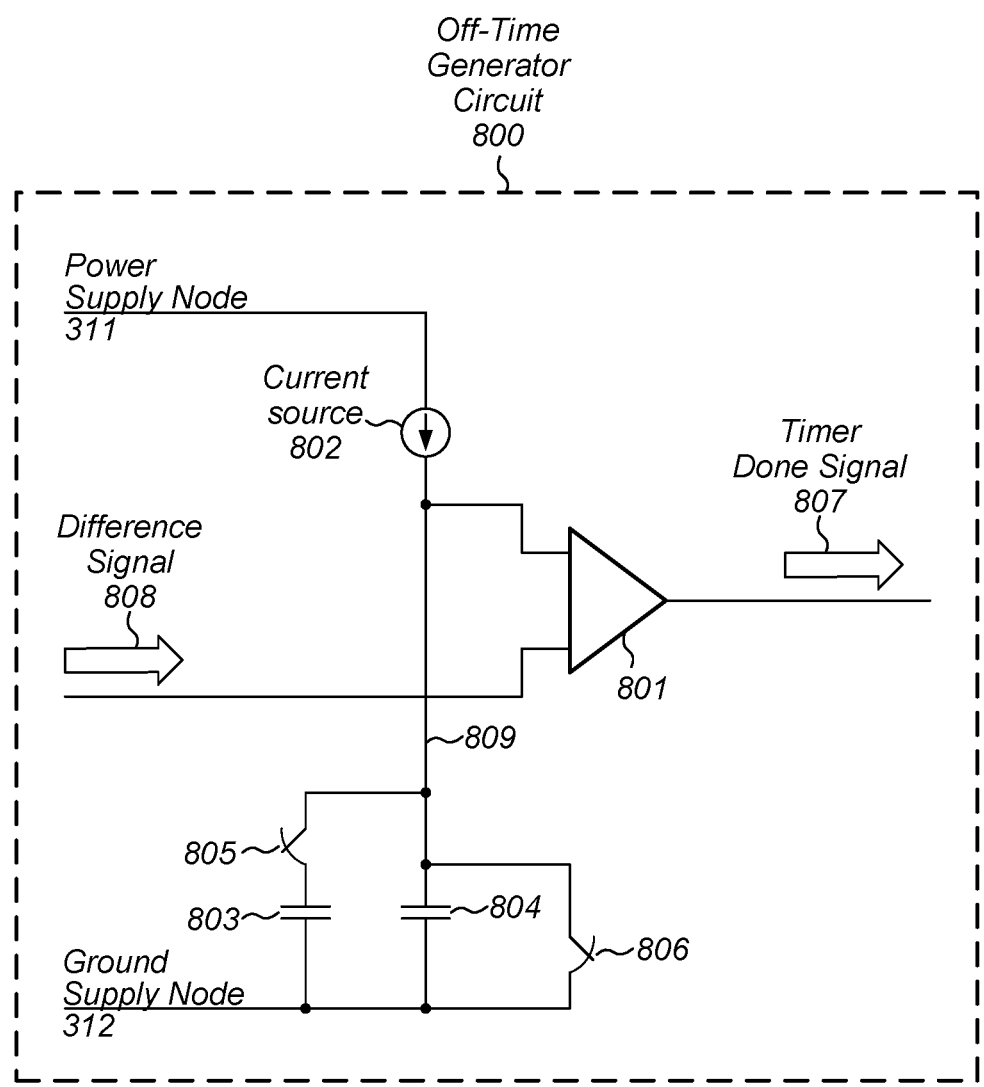
FIG. 8 is a block diagram of an embodiment of an off-time generator circuit.

Turning to FIG. 8, an embodiment of a full/half off-time generator circuit that is configured to determine a full off-time as well as a half off-time is depicted. As illustrated, full/half off-time generator circuit 800 includes comparator circuit 801, current source 802, capacitors 803 and 804, and switches 805 and 806. In various embodiments, full/half off-time generator circuit 800 may correspond to full/half off-time generate circuit 421 as depicted in FIG. 4.

Current source 802 is coupled between power supply node 311 and node 809, and is configured to source current to node 809, charging capacitor 804 (and capacitor 803 when switch 805 is closed). In various embodiments, a value of current source 802 may be proportional to the voltage level of power supply node 311. The constant of proportionality may be a value of a resistor that is chosen, along with the values of capacitors 803 and 804, to set the full and half off-time values. In some embodiments, current source 802 may include one or more p-channel MOSFETs or other suitable transconductance devices configured to provide a particular conductance between power supply node 311 and node 809.

Capacitor 804 is coupled between node 809 and ground supply node 312, while capacitor 803 is coupled between switch 805 and ground supply node 312. Switch 805 is also coupled to node 809, while switch 806 is coupled between node 809 and ground supply node 312.

Switch 805 controls whether full/half off-time generator circuit 800 determines a full off-time or a half off-time. When switch 805 is closed, capacitors 803 and 804 are coupled in parallel, increasing the capacitance on node 809, thereby resulting in a longer time for the voltage level of node 809 to increase to the level of difference signal 808. When switch 805 is open, capacitor 803 is not coupled to node 809, thereby allowing the voltage level of node 809 to increase more rapidly in response to the current from current source 802. Switch 806 is configured to selectively couple node 809 to ground supply node 312. Once timer done signal 807 has been asserted, switch 806 is closed, discharging node 809 to a voltage level at or near ground potential, readying full/half off-time generator circuit 800 for a next cycle.

Capacitors 803 and 804 may be constructed using a metal-oxide-metal or other suitable structures available on a semiconductor manufacturing process. In some embodiments, capacitors 803 and 804 may be constructed so as to have similar capacitance values. Switches 805 and 806 may, in various embodiments, be particular embodiments of either p-channel or n-channel MOSFETs, or any suitable combination thereof.

Comparator circuit 801 may be an embodiment of a differential amplifier configured to generate timer done signal 807 using difference signal 808 and the voltage level of node 809. Difference signal 808 may, in various embodiments, be proportional to a difference between the voltage level of regulated power supply node 104 and the voltage level of power supply node 311. In various embodiments, timer done signal 807 may transition from a low logic level to a high logic level, in response to a determination that a voltage level of node 809 is greater than the voltage level of difference signal 808.

Figure 9:
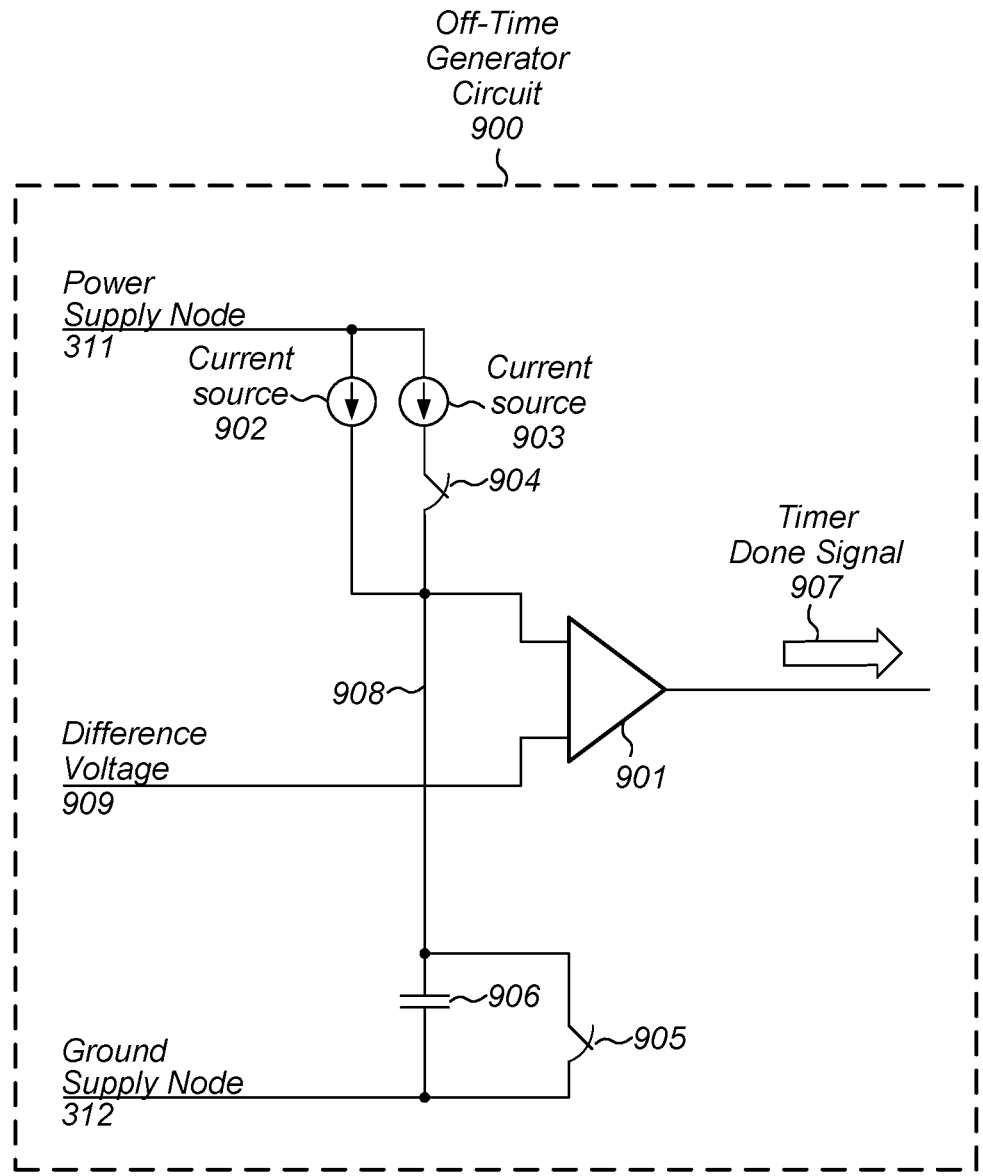
FIG. 9 is a block diagram of another embodiment of an off-time generator circuit.

Turning to FIG. 9, another embodiment of a full/half off-time generator is depicted. As illustrated, full/half off-time generator circuit 900 includes comparator 901, current sources 902 and 903, capacitor 906, and switches 904 and 905. In various embodiments, full/half on-time generator circuit 900 may correspond to full/half on-time generator circuit 421 as depicted in FIG. 4.

Current source 902 is coupled between power supply node 311 and node 608, and is configured to source current to node 908, charging capacitor 906. In various embodiments, a value of current source 902 may be proportional to the voltage level of power supply node 311. The constant of proportionality may be a value of a resistor that is chosen, along with the values of capacitor 906, to set the full and half off-time values.

Current source 903 is coupled between power supply node 311 and switch 904, and is configured to source a current to node 908 when switch 904 is closed. In various embodiments, a value of the current sourced by current source 903 may be the same as a value of a current sourced by current source 902. When switch 904 is closed, current from both current source 902 and current source 903 charge capacitor 906, thereby reducing a time for the voltage across capacitor 906 to reach a target value. By charging capacitor 906 more rapidly, full/half off-time generator circuit 900 can generate a half off-time value, where timer done signal 907 is asserted in half the time compared to when switch 904 is open.

In some embodiments, current sources 902 and 903 may include one or more p-channel MOSFETs or other suitable transconductance devices configured to provide a particular conductance between power supply node 311 and node 908.

Capacitor 906 is coupled between node 908 and ground supply node 312, while switch 905 is also coupled between node 908 and ground supply node 312. Switch 905 is configured to selectively couple node 908 to ground supply node 312. Once timer done signal 907 has been asserted, switch 905 is closed, discharging node 908 to a voltage level at or near ground potential, readying full/half off-time generator circuit 900 for a next cycle.

Capacitor 906 may be constructed using a metal-oxide-metal or other suitable structures available on a semiconductor manufacturing process. Switches 904 and 905 may, in various embodiments, be particular embodiments of either p-channel or n-channel MOSFETs, or any suitable combination thereof.

Comparator 901 may be an embodiment of a differential amplifier configured to generate timer done signal 907 using the difference voltage 909 and the voltage level of node 908. In some embodiments, difference voltage 909 is a difference between the voltage of power supply node 311 and the voltage level of regulated power supply node 104. In various embodiments, timer done signal 907 may transition from a low logic level to a high logic level, in response to a determination that a voltage level of node 908 is greater than the voltage level of regulated power supply node 104.

Figure 10:
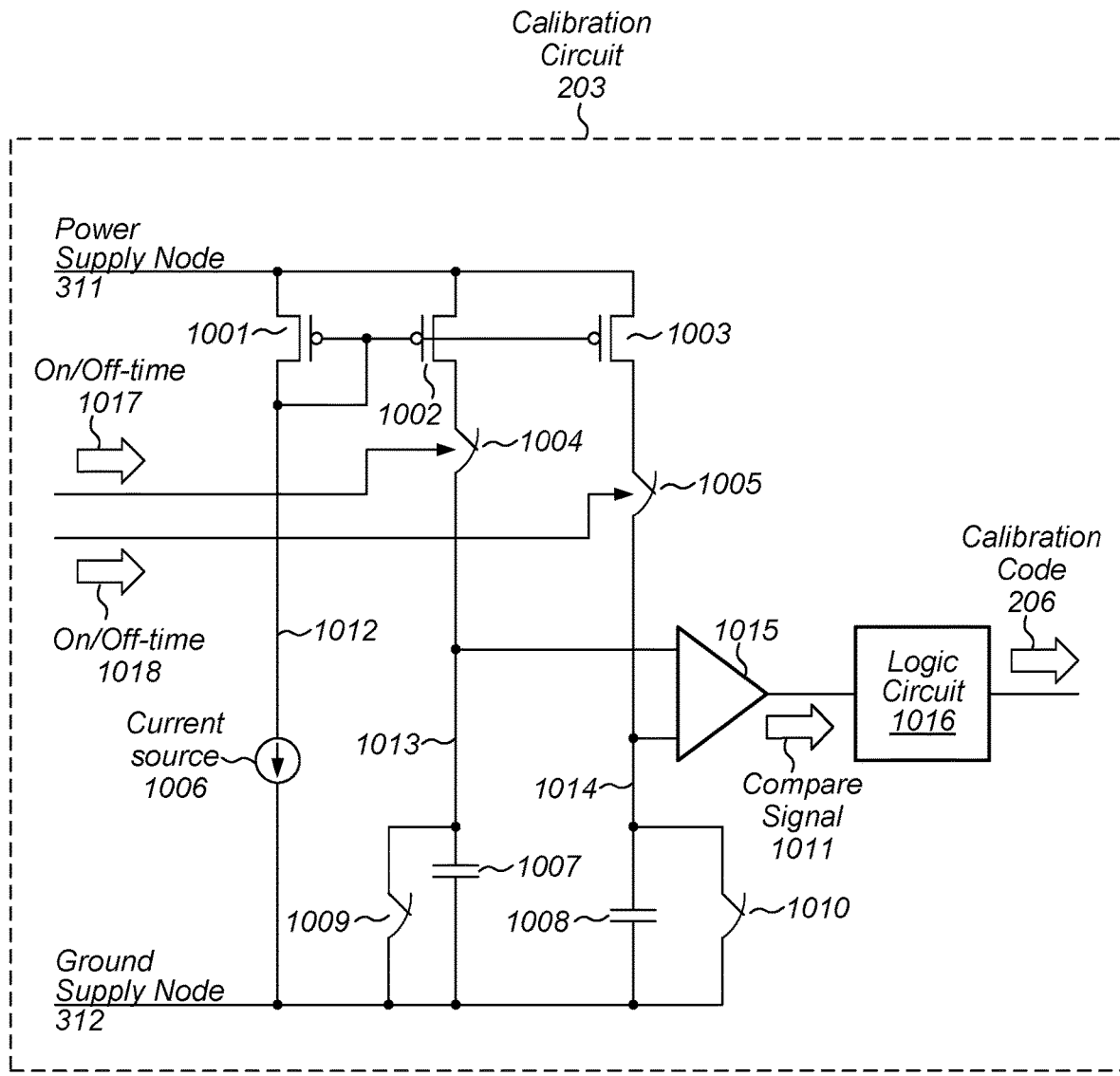
FIG. 10 is a block diagram of a calibration circuit.

A block diagram of an embodiment of calibration circuit 203 is depicted in FIG. 10. As illustrated, calibration circuit 203 includes devices 1001-1003, switches 1004, 1005, 1009, and 1010, current source 1006, comparator 1015, and logic circuit 1016.

Device 1001 is coupled between power supply node 311 and node 1012, and is controlled by a voltage level of node 1012. Device 1002 is coupled between power supply node 311 and switch 1004, while device 1003 is coupled between power supply node 311 and switch 1005. Both device 1002 and 1003 are controlled by the voltage level of node 1012. Devices 1001-1003 are arranged to form a current mirror circuit, with devices 1002 and 1003 mirroring a current flowing through device 1001, resulting from current source 1006. In various embodiments, devices 1001-1003 may be embodiments of p-channel MOSFETs.

Current source 1006 is configured to generate a current in device 1001, which is mirrored in devices 1002 and 1003. In various embodiments, current source 1006 may include multiple MOSFETs, including a MOSFET biased to provide a desired current value.

Switch 1004 is coupled between device 1002 and node 1013, while switch 1005 is coupled between device 1003 and node 1014. Switch 1004 is configured to couple, based on on/off-time 1017, device 1002 to capacitor 1007, allowing a current flowing through device 1002 to charge capacitor 1007. In a similar fashion, switch 1005 is configured to selectively couple, based on on/off-time 1018, device 1003 to capacitor 1008, allowing a current flowing through device 1003 to charge capacitor 1008. In various embodiments, on/off-time 1017 corresponds to the first on-time after an initial on-time for phase 102 operating in an off-time peak current control mode, or the first off-time after an initial on-time for phase 102 operating in an on-time valley current control mode. In a similar fashion, on/off-time 1018 corresponds to the first on-time after an initial on-time for phase 103 operating in an off-time peak current control mode, or the first off-time after an initial on-time for phase 103 operating in an on-time valley current control mode.

When switch 1004 is closed, the current flowing through device 1002 charges capacitor 1007 to a voltage level that is proportional to a duration of on/off-time 1017. In a similar fashion, when switch 1005 is closed, the current flowing through device 1003 charges capacitor 1008 to a voltage level that is proportional to a duration of initial on/off-time 1018. As described below, comparator 1015 is configured to generate compare signal 1011 using the voltages across capacitors 1007 and 1008. By comparing the two voltage levels, in this fashion, compare signal 1011 may correspond to a difference between the two on/off-time signals. It is noted that by employing off-time signals to control switches 1004 and 1005, the circuit may be used for calibration in adaptive on-time valley current control schemes.

Capacitor 1007 and switch 1009 are both coupled between node 1013 and ground supply node 312, while capacitor 1008 and switch 1010 are both coupled between node 1014 and ground supply node 312. Switches 1009 and 1010 are configured to couple, in response to a reset signal, node 1013 and node 1014, respectively, to ground supply node 312 to discharge capacitors 1007 and 1008, in preparation for taking another sample. At the beginning of an active PFM period, switches 1009 and 1010 are open to allow for sampling of the first on/off time after the initial on-time. At the end of an active PFM period, switches 1009 and 1010 are closed to reset nodes 1013 and 1014.

Capacitors 1007 and 1008 may be constructed using a metal-oxide-metal or other suitable structure available on a semiconductor manufacturing process. In some embodiments, capacitors 1007 and 1008 may be constructed so as to have similar capacitance values. Switches 1004, 1005, 1009, and 1010 may, in various embodiments, be implemented as either p-channel or n-channel MOSFETs, or any suitable combination thereof.

Comparator 1015 is configured to generate compare signal 1011 using the respective voltage levels of nodes 1013 and 1014. In various embodiments, comparator 1015 may be an embodiment of a differential amplifier configured to generate compare signal 1011 such that a magnitude of compare signal 1011 may be proportional to a difference between the voltage level of node 1013 and the voltage level of node 1014.

Logic circuit 1016 is configured to generate calibration code 206 using compare signal 1011. In various embodiments, logic circuit 1016 may include an analog-to-digital converter circuit configured to generate multiple bits whose value encode the voltage level of compare signal 1011. In various embodiments, calibration code 206 may be used to adjust average voltage 705 in order to equalize the first on-time after the initial on-time so that a desired 180-degree phase shift between the current in coils 111A-B can be achieved.

Figure 11:
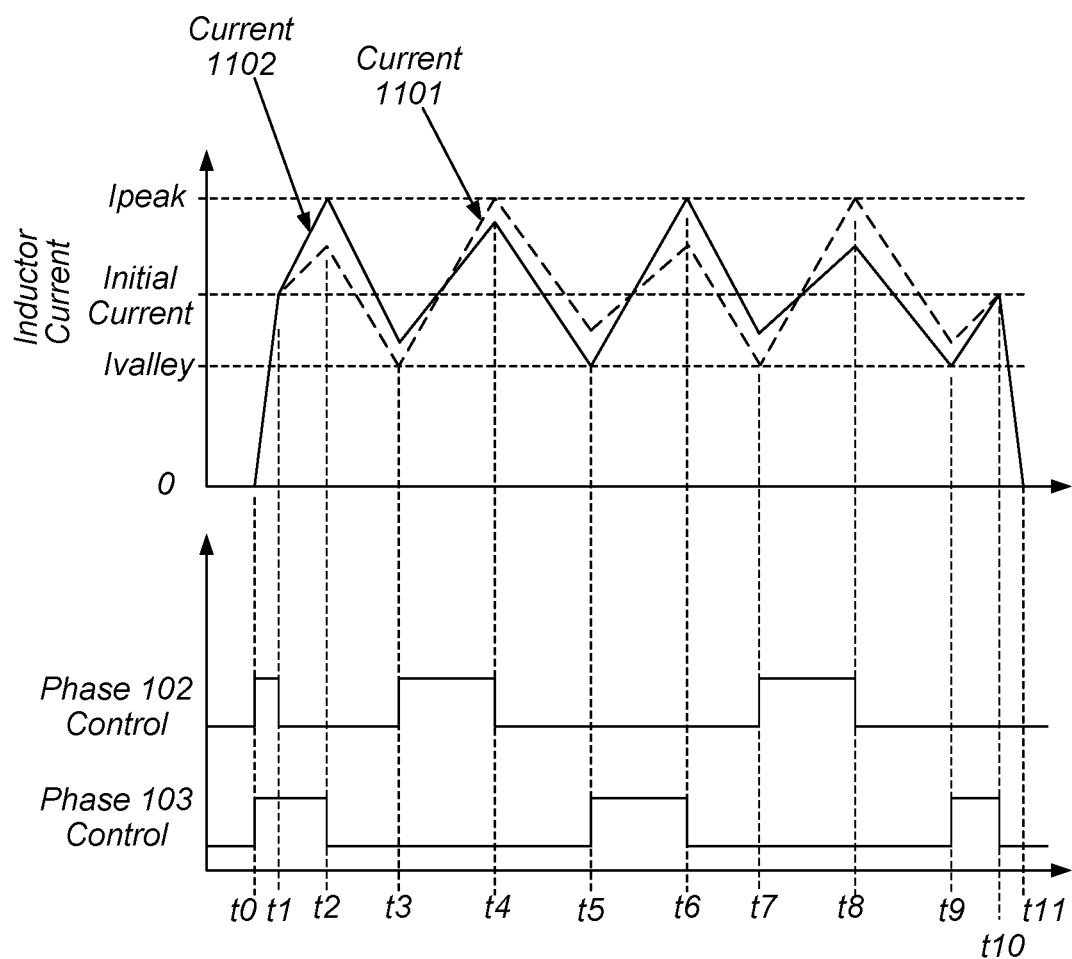
FIG. 11 depicts example waveforms associated with the operation of a power converter.

Turning to FIG. 11, example waveforms associated with the operation of a power converter circuit (e.g., power converter circuit 100) are illustrated. It is noted that the waveforms are an example of valley current on-time regulation, and that different operating modes (e.g., peak current regulation), different component values, different duty cycles, and the like, may result in waveforms with a different appearance than those illustrated in FIG. 11.

At time t0, an active period is initiated. As described above, the active period may be initiated based on a comparison of the voltage level of regulated power supply node 104 and reference voltage level 105. Once the active period has been initiated, both phase circuits 102 and 103 transition to a starting on-time period, and begin supplying energy to their respective switch nodes, allowing currents 1101 and 1102 to begin to increase. It is noted that current 1101 may correspond to a current flowing through coil 111A and current 1102 may correspond to a current flowing through coil 111B.

At time t1, the starting on-time elapses, and phase 102 control signal transitions from a high logic level to a low logic level, placing phase circuit 102 into an off-time. Current 1101 continues to increase between times t1 and t2, even though phase 102 is in an off-time in the illustrated example. It is noted that depending on the duty cycle and the coupling factor between the coils, the slope of inductor current 1101 can be either positive or negative during the time period between t1 and t2. Also, at time t1, phase 103 control signal remains at high logic level, keeping phase circuit 103 in an on-time, allowing current 1102 to increase.

At time t2, a half on-time period elapses, and the phase 103 control signal transitions to a low logic level. Phase circuit 103 transitions to an off-time period by opening its high side switch and closing its low side switch, causing current 1102 to decrease. Phase circuit 102 remains in an off-time period, and current 1101 continues to decrease.

At time t3, current 1101 reaches Ivalley, triggering a full on-time period for phase circuit 102. The phase 102 control signal transitions from a low logic level to a high logic level, opening the low side switch of phase circuit 102 and closing the high side switch of phase circuit 102. During this time phase circuit 103 remains in an off-time period.

At time t4, the full on-time period for phase circuit 102 elapses and the phase 102 control transitions to a low logic level, placing phase circuit 102 is an off-time period, where current 1101 begins to decrease. Phase circuit 103 remains in an off-time period during this time.

At time t5, current 1102 reaches Ivalley, triggering a full on-time period for phase circuit 103. The phase 103 control signal transitions from a low logic level to a high logic level. Phase circuit 103 opens its low side switch and closes its high side switch, allowing current 1102 to increase. Phase circuit 102 remains in an off-time period during this time.

At time t6, the full on-time period for phase circuit 103 elapses and the phase 103 control signal transitions to a low logic level, placing phase circuit 103 in an off-time period, wherein current 1102 begins to decrease. Phase circuit 102 remains in an off-time period during this time.

At time t7, current 1101 reaches Ivalley, triggering a full on-time period for phase circuit 102. The phase 102 control signal transitions from a low logic level to a high logic level, opening the low side switch of phase circuit 102 and closing the high side switch of phase circuit 102. During this time phase circuit 103 remains in an off-time period.

At time t8, the full on-time period for phase circuit 102 elapses and the phase 102 control transitions to a low logic level, placing phase circuit 102 is an off-time period, where current 1101 begins to decrease. Phase circuit 103 remains in an off-time period during this time.

At time t9, current 1102 reaches Ivalley. Since currents 1101 and 1102 have reached Ivalley a threshold number of times, a half on-time period for phase circuit 103. The phase 103 control signal transitions from a low logic level to a high logic level, opening the low side switch of phase circuit 103 and closing the high side switch of phase circuit 103. During this time phase circuit 102 remains in an off-time period.

At time t10, the half on-time period for phase circuit 103 elapses and phase circuit 103 is placed in an off-time period. At time t11, both currents 1101 and 1102 are zero, phase circuits 102 and 103 are placed in an inactive mode, ready for another active period.

Figure 12:
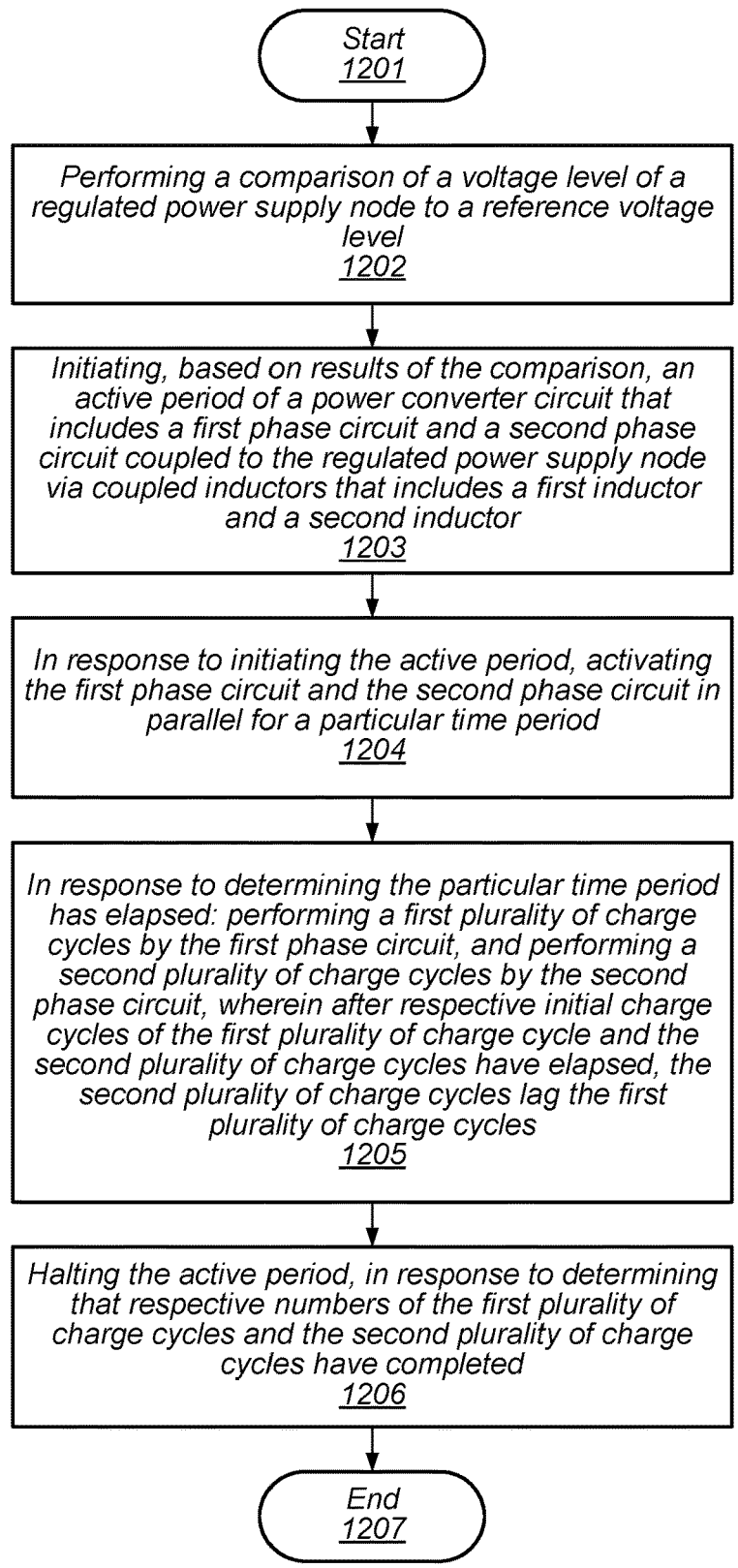
FIG. 12 depicts a flow diagram illustrating an embodiment of a method for operating a power converter circuit.

Turning to FIG. 12, a flow diagram depicting an embodiment of a method for operating a power converter circuit is illustrated. The method, which may be applied to power converter circuit 100, begins in block 1201.

The method includes performing a comparison of a voltage level of a regulated power supply node to a reference voltage level (block 1202). As described above, a differential amplifier or other suitable circuit may be used to perform the comparison.

The method also includes initiating, based on results of the comparison, an active period of a power converter circuit that includes a first phase circuit and a second phase circuit coupled to the regulated power supply node via coupled inductors that includes a first inductor and a second inductor (block 1203).

The method further includes, in response to initiating the active period, activating the first phase circuit and the second phase circuit for a particular time period (block 1204). In various embodiments, the method may also include generating the particular time period (also referred to as an "initial on-time") using a current to charge a capacitor, and comparing a voltage across the capacitor to a reference value. By activating both phase circuits in parallel, currents through the first and second inductors can be brought to a threshold level prior to initiating a phase shift between the two currents.

The method also includes, in response to determining the particular time period has elapsed: performing a first plurality of charge cycles by the first phase circuit, and performing a second plurality of charge cycles by the second phase circuit, where after respective initial charge cycles of the first plurality of charge cycles and the second plurality of charge cycles have elapsed, the second plurality of charge cycles lag the first plurality of charge cycles (block 1205).

In various embodiments, the duration of an initial charge cycle of the second plurality of charge cycles is less than a duration of a subsequent charge cycle of the second plurality of charge cycle. By decreasing the duration of the initial charge cycle (after the particular time period has elapsed), the phase shift between the first and second plurality of charge cycles may be achieved. In some cases, the method also includes halting the first initial charge cycle in response to determining the first current is greater than a threshold value. The method may, in some embodiments, include charging a capacitor with a reference current, and halting the second initial charge cycle, in response to determining that a voltage across the capacitor is greater than a threshold value.

In some cases, the method further includes sourcing, by the first phase circuit during the first initial charge cycle, a first current to the regulated power supply node via the first inductor, and sourcing, by the second phase circuit during the second initial charge cycles, a second current to the regulated power supply node via the second inductor. The method may also include, in response to determining the first initial charge cycle has elapsed, sinking a third current from the regulated power supply node by the first phase circuit, and in response to determining the second initial charge cycle has elapsed, sinking a fourth current from the regulated power supply node by the second phase circuit.

The method also includes halting the active period, in response to determining that respective numbers of the first plurality of charge cycles and the second plurality of charge cycles have completed (block 1206). In various embodiments, determining that the respective number of the first plurality of charge cycles and the second plurality of charge cycles have complete may include determining a number of times a current flowing in the first inductor reaches a threshold value, and determining a number of times a current flowing in the second inductor reaches the threshold value. The threshold value may be a peak current value or a valley current value based upon which mode of regulation is being employed.

In some embodiments, halting the active period includes performing a first discharge cycle by the first phase circuit, performing a second discharge cycle by the second phase circuit, and, in response to determining respective currents in the first inductor and the second inductor are zero, halting the first and second discharge cycles. The method concludes in block 1207.

Figure 13:
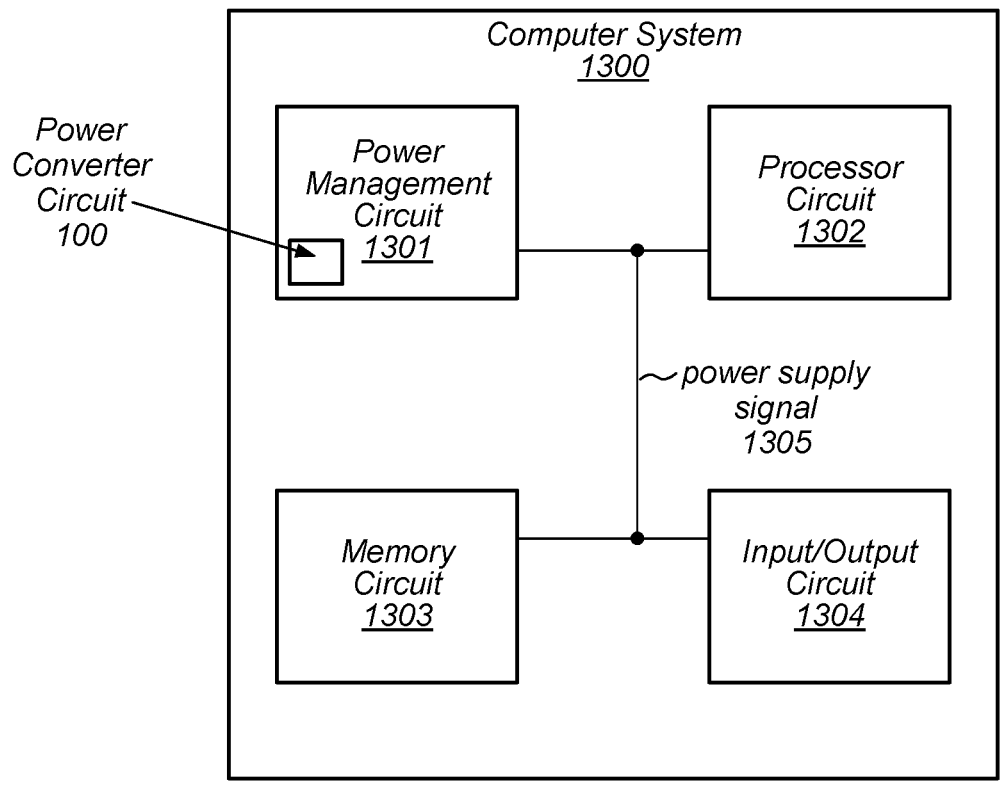
FIG. 13 illustrates a block diagram of a computer system.

A block diagram of computer system is illustrated in FIG. 13. In the illustrated embodiment, the computer system 1300 includes power management unit 1301, processor circuit 1302, memory circuit 1303, and input/output circuits 1304, each of which is coupled to power supply signal 1305. In various embodiments, computer system 1300 may be a system-on-a-chip (SoC) and/or be configured for use in a desktop computer, server, or in a mobile computing application such as, e.g., a tablet, laptop computer, or wearable computing device.

Power management unit 1301 includes power converter circuit 100 which is configured to generate a regulated voltage level on power supply signal 1305 in order to provide power to processor circuit 1302, memory circuit 1303, and input/output circuits 1304. Although power management unit 1301 is depicted as including a single power converter circuit, in other embodiments, any suitable number of power converter circuits may be included in power management unit 1301, each configured to generate a regulated voltage level on a respective one of multiple internal power supply signals included in computer system 1300. In cases where multiple power converter circuits are employed, two or more of the multiple power converter circuits may be connected to a common set of power terminals that connections to power supply signals and ground supply signals of computer system 1300.

Processor circuit 1302 may, in various embodiments, be representative of a general-purpose processor that performs computational operations. For example, processor circuit 1302 may be a central processing unit (CPU) such as a microprocessor, a microcontroller, an application-specific integrated circuit (ASIC), or a field-programmable gate array (FPGA).

Memory circuit 1303 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 13, in other embodiments, any suitable number of memory circuits may be employed.

Input/output circuits 1304 may be configured to coordinate data transfer between computer system 1300 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1304 may be configured to implement a version of Universal Serial Bus (USB) protocol or IEEE 1394 (Firewire®) protocol.

Input/output circuits 1304 may also be configured to coordinate data transfer between computer system 1300 and one or more devices (e.g., other computing systems or integrated circuits) coupled to computer system 1300 via a network. In one embodiment, input/output circuits 1304 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1304 may be configured to implement multiple discrete network interface ports.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase s not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
a control circuit configured to initiate, based on a voltage level of a regulated power supply node and a reference voltage level, an active period for a particular power regulation mode;
a first phase circuit coupled to a first switch node that is coupled to the regulated power supply node via a first coil of a pair of coupled inductors, wherein the first phase circuit is configured, in response to an initiation of the active period, to cycle between on-time and off-time periods after a starting on-time period has elapsed since the initiation of the active period; and
a second phase circuit coupled to a second switch node that is coupled to the regulated power supply node via a second coil of the pair of coupled inductors, wherein the second phase circuit is configured, in response to the initiation of the active period, to cycle between on-time and off-time periods after the starting on-time period has elapsed, wherein a duration of a first on-time period for the second phase circuit is less than a duration of a subsequent on-time period for the second phase circuit.

2. The apparatus of claim 1, wherein, when the particular power regulation mode is set to be a valley current control mode, and wherein the duration of the first on-time period of the second phase circuit is half the duration of the subsequent on-time period for the second phase circuit.

3. The apparatus of claim 2, wherein a first current flowing in the first coil is out of phase with a second current flowing in the second coil by 180 degrees after the first on-time period has elapsed.

4. The apparatus of claim 1, wherein the control circuit is further configured to halt the active period based on a number of times respective currents in the first coil and the second coil reach a threshold value.

5. The apparatus of claim 1, wherein to initiate the active period, the control circuit is further configured to compare the voltage level of the regulated power supply node and the reference voltage level.

6. The apparatus of claim 1, wherein, when the particular power regulation mode is set to peak current control mode, the first phase circuit is further configured to:
set the duration of a given off-time period to a fixed value; and
determine a duration of a given on-time period is based on a comparison of a current in the first coil and a threshold value.

7. A method, comprising:
performing a comparison of a voltage level of a regulated power supply node to a reference voltage level;

initiating, based on results of the comparison, an active period of a power converter circuit that includes a first phase circuit and a second phase circuit coupled to the regulated power supply node via coupled inductors that includes a first inductor and a second inductor;

in response to initiating the active period, activating the first phase circuit and the second phase circuit in parallel for a starting time period;

in response to determining the starting time period has elapsed:
   performing a first plurality of charge cycles by the first phase circuit;
   performing a second plurality of charge cycles by the second phase circuit, wherein after respective initial charge cycles of the first plurality of charge cycle and the second plurality of charge cycles have elapsed, the second plurality of charge cycles lag the first plurality of charge cycles; and halting the active period, in response to determining that respective numbers of the first plurality of charge cycles and the second plurality of charge cycles have completed.

8. The method of claim 7, wherein a duration of an initial charge cycle of the second plurality of charge cycles is less than a duration of a subsequent charge cycle of the second plurality of charge cycles.

9. The method of claim 8, further comprising:
sourcing, by the first phase circuit during a given charge cycle of the first plurality of charge cycles, a first current to the regulated power supply node via the first inductor; and
sourcing, by the second phase circuit during a different charge cycle of the second plurality of charge cycles, a second current to the regulated power supply node via the second inductor.

10. The method of claim 9, further comprising:
in response to determining the given charge cycle has elapsed, coupling a terminal of the first inductor to ground by the first phase circuit; and
in response to determining the different charge cycle has elapsed, coupling a terminal of the second inductor to ground by the second phase circuit.

11. The method of claim 9, further comprising halting the given charge cycle in response to determining the first current is greater than a threshold value.

12. The method of claim 9, further comprising:
charging a capacitor with a reference current; and
halting the initial charge cycle, in response to determining that a voltage across the capacitor is greater than a threshold voltage.

13. The method of claim 7, wherein halting the active period includes:
performing a first discharge cycle by the first phase circuit;
performing a second discharge cycle by the second phase circuit; and
in response to determining respective currents in the first inductor and the second inductor are zero, halting the first discharge cycle and the second discharge cycle.

14. An apparatus, comprising:
a functional circuit block coupled to a regulated power supply node; and
a power converter circuit coupled to the regulated power supply node via coupled inductors, wherein the power converter circuit includes a first phase circuit coupled to regulated power supply node via a first inductor of the coupled inductors, and a second phase circuit coupled to the regulated power supply node via a second inductor of the coupled inductors, and wherein the power converter circuit is configured to:
   perform a comparison of a voltage level of the regulated power supply node to a reference voltage level;
   initiate an active period based on results of the comparison; and
   activate, in parallel, the first phase circuit and the second phase circuit for a starting time period, in response to an initiation of the active period,
wherein the first phase circuit is configured, in response to a determination that the starting time period has elapsed, to perform a first plurality of charge cycles;
wherein second phase circuit is configured, in response to the determination that the starting time period has elapsed, to perform a second plurality of charge cycles, wherein after respective initial charge cycles of the first plurality of charge cycle and the second plurality of charge cycles have elapsed, the second plurality of charge cycles lag the first plurality of charge cycles; and
wherein the power converter circuit is further configured to halt the active period, in response to a determination that respective numbers of the first plurality of charge cycles and the second plurality of charge cycles have elapsed.

15. The apparatus of claim 14, wherein a duration of an initial charge cycle of the second plurality of charge cycles is less than a duration of a subsequent charge cycle of the second plurality of charge cycles.

16. The apparatus of claim 15, wherein the first phase circuit is further configured to source, during a given charge cycle of the first plurality of charge cycles, a first current to the regulated power supply node via the first inductor, and wherein the second phase circuit is further configured to source, during a different charge cycle of the second plurality of charge cycles, a second current to the regulated power supply node via the second inductor.

17. The apparatus of claim 16, wherein the first phase circuit is further configured, in response to a determination that the given charge cycle has elapsed, couple a terminal of the first inductor to ground, and wherein the second phase circuit is further configured, in response to a determination that the different charge cycle has elapse, coupled a terminal of the second inductor to ground.

18. The apparatus of claim 16, wherein the power converter circuit is further configured to:
charge a capacitor with a reference current; and
halt the initial charge cycle, in response to a determination that a voltage across the capacitor is greater than a threshold voltage.

19. The apparatus of claim 16, wherein the power converter circuit is further configured to:
charge a capacitor using a reference current;
perform a comparison of a voltage across the capacitor to the voltage level of the regulated power supply node; and
halt, using results of the comparison, the given charge cycle.

20. The apparatus of claim 14, further comprising:
wherein the first phase circuit is further configured, in response to a determination that the active period has been halted, to perform a first discharge cycle; and
wherein the second phase circuit is further configured to perform a second discharge cycle.

* * * * *